United States Patent [19]

Hideshima et al.

[11] Patent Number: 5,343,470
[45] Date of Patent: Aug. 30, 1994

[54] MULTIPLEX TRANSMISSION SYSTEM

[75] Inventors: Masao Hideshima; Osamu Michihira, both of Hiroshima; Yoshikazu Nobutoki, Higashihiroshima; Akira Sone, Hiroshima, all of Japan

[73] Assignee: Mazda Motor Corporation, Hiroshima, Japan

[21] Appl. No.: 102,953

[22] Filed: Aug. 6, 1993

Related U.S. Application Data

[63] Continuation of Ser. No. 760,020, Sep. 13, 1991, abandoned.

[30] Foreign Application Priority Data

Sep. 13, 1990 [JP] Japan .................................. 2-241277
Sep. 20, 1990 [JP] Japan .................................. 2-248724
Sep. 20, 1990 [JP] Japan .................................. 2-248725

[51] Int. Cl.⁵ ...................... H04L 12/40; H04L 12/42
[52] U.S. Cl. .............................. 370/85.1; 340/870.13; 340/439; 340/441; 370/85.15
[58] Field of Search ................... 370/85.1, 85.2, 85.3, 370/85.4, 85.5, 85.6, 85.15; 340/825.5, 825.51, 438, 439, 440, 441, 449, 450, 450.1, 450.2, 450.3, 451, 452, 455, 459, 870.13

[56] References Cited

U.S. PATENT DOCUMENTS

| | | | |
|---|---|---|---|
| 4,584,487 | 4/1986 | Hesse et al. | 370/85.6 |
| 4,715,031 | 12/1987 | Crawford et al. | 370/85.6 |
| 4,939,725 | 7/1990 | Matsuda et al. | 370/85.3 |
| 4,942,571 | 7/1990 | Möller et al. | 370/85.1 |
| 4,951,281 | 8/1990 | Muto et al. | 370/95.2 |
| 5,090,012 | 2/1992 | Kajiyama et al. | 370/85.3 |

*Primary Examiner*—Wellington Chin

[57] ABSTRACT

In a multiplex transmission system wherein data is transmitted among a plurality of control units connected to a multiplex transmission line in decentralized fashion, communication is performed upon changing the period of the data transmission among the control units and the method of transmission, such as the order of priority of transmission, in dependence upon the travelling state of the vehicle equipped with the multiplex transmission system, the operating states of the control units or the control unit which is a party to the communication.

18 Claims, 14 Drawing Sheets

| STATE OF VEHICLE<br>COMMUNICATION-<br>PARTY C/U | ① VEHICLE VELOCITY > 180 km/h | ② TURNING | ③ LOW-μ ROAD | | ① AND ② |
|---|---|---|---|---|---|
| C/U B (NIC) | 6 | 7 | 7 | - - - - - | |
| C/U C (ABS/TRC) | 2 | 2 | 1 | - - - - - | |
| C/U D (4WS) | 2 | 1 | 2 | - - - - - | |

<div style="text-align:center">

PERIOD

1 : 12ms
2 : 24ms
3 : 30ms
⋮
7 : 70ms
8 : 80ms
9 : 90ms
⋮

</div>

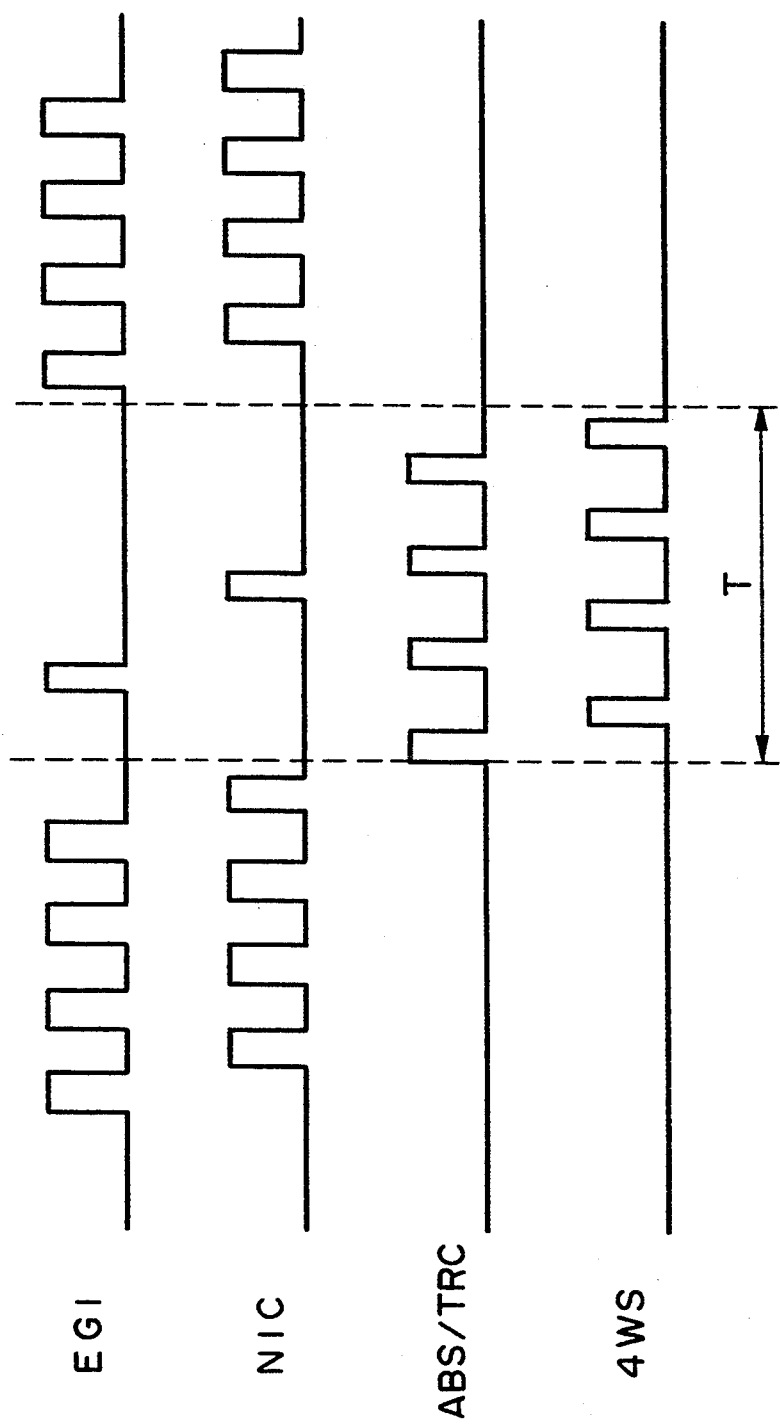

| COMMUNICATION-PARTY C/U \ STATE OF VEHICLE | ① VEHICLE VELOCITY > 180 km/h | ② TURNING | ③ LOW-μ ROAD | ... | ① AND ② |
|---|---|---|---|---|---|
| C/U B (NIC) | 6 | 7 | 7 | ---- | |
| C/U C (ABS/TRC) | 2 | 2 | 1 | ---- | |
| C/U D (4WS) | 2 | 1 | 2 | ---- | |

PERIOD
1 : 12ms
2 : 24ms
3 : 30ms
⋮
7 : 70ms
8 : 80ms
9 : 90ms

FIG. 8A

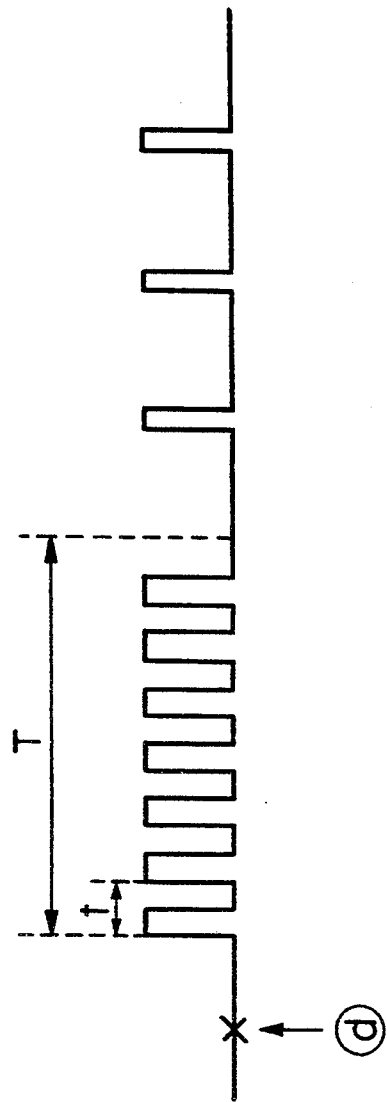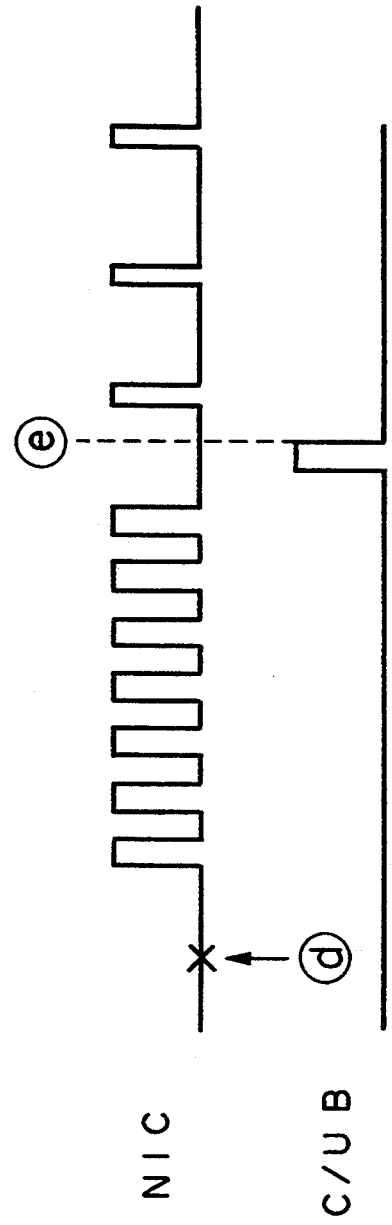
FIG. 11A
FIG. 11B

MULTIPLEX TRANSMISSION SYSTEM

This application is a continuation of application Ser. No. 07/760,020, filed Sep. 13, 1991, now abandoned.

BACKGROUND OF THE INVENTION

This invention relates to a multiplex transmission system and, more particularly, to a multiplex transmission system for connecting a plurality of control units in a vehicle to a multiplex transmission line and performing an exchange of information among the control units.

In a multiplex transmission system which employs decentralized multiplexing for transmitting and receiving signals between electrical accessories mounted in a vehicle, plural items of data are multiplexed on a time-shared basis on a pair of transmission lines, and serial transmission is the fundamental type of transmission used.

In a multiplex transmission system employing such decentralized multiplex transmission, each node has its own transmission LSI, microprocessor or the like, and these perform such operations as transmission control and analysis of received information in accordance with prescribed algorithms.

However, since each node transmits data, which is necessary for control, at fixed intervals in the prior art described above, a problem which arises is that it is difficult for another node which performs another kind of control to interrupt the data transmission, and therefore a delay develops in this control. In addition, in a case where the period of a data transmission is lengthened, the period for updating the data also is lengthened as a result, and this makes it easy for transmission errors and control delay to occur.

In a case where a data transmission is performed periodically between nodes upon deciding order of priority, a problem which arises is that, depending upon the travelling state of the vehicle, the frequency of data transmission with nodes having a low order of priority rises, as a result of which a data transmission with these nodes either cannot be carried out or is delayed.

Furthermore, since each node transmits data necessary for control at fixed intervals (i.e., at a fixed period), as mentioned above, the density of data on a transmission line is constant at all times regardless of whether the data is important or not in terms of control. In particular, if the amount of data having comparatively little importance transmitted on a transmission line occupies a major share of the line, the probability of performing a transmission of data having a high degree of importance declines, and this causes a delay in control relating to this data.

Another problem is that after the ignition of a vehicle is turned on (IG-ON), the voltage supplied to each control unit declines owing to consumption of power by the starter during starting of the engine, and the transmission operation is destabilized as a result. Though this destabilizing influence upon the transmission operation becomes particularly pronounced at cold starting of the engine, the following problems also arise if the unit which administers engine control receives this destabilizing influence even when the engine is not being cold-started:

(1) Control at starting cannot be performed normally. This may make it difficult or impossible to start the engine or may cause a delay in starting.

(2) Checking of transmitted and received data (control of an ACK signal, which is a reception acknowledgement signal) at the control unit cannot be performed normally.

In a case where a specific control unit undergoes system reset owing to an abnormality in the power-supply system during travelling of the vehicle, the state of the engine or control unit will be unstable even if the power-supply system is restored to normal. Consequently, reception of a signal from another control unit cannot be performed reliably, and engine control cannot be restored or develops a delay.

SUMMARY OF THE INVENTION

An object of the present invention is to provide a multiplex transmission system which raises the efficiency of data transmission among control units forming the multiplex transmission system, and which prevents control delay and transmission error.

Another object of the present invention is to provide a multiplex transmission system in which signal density on a transmission line of the multiplex transmission system is made appropriate to perform transmission efficiently and prevent control delay.

Still another object of the present invention is to provide a multiplex transmission system for hastening rise time when operation of a control unit forming the multiplex transmission system is restored from the unstable to the stable state.

According to the present invention, the foregoing objects are attained by providing a multiplex transmission system in which a plurality of control units connected in decentralized fashion to a common transmission line transmit and receive information to and from one another, comprising informing means for informing each control unit of the travelling state of a vehicle in the form of information, and transmission control means for changing a method in which information is transmitted among the plurality of control units, the change being made in dependence upon the travelling state of the vehicle.

In a preferred embodiment, the transmission control means is adapted to transmit information among the control units at a prescribed period under ordinary conditions, and to change the method of transmission at starting of an engine in such a manner that the information is transmitted at a period shorter than the prescribed period.

In a preferred embodiment, the transmission control means decides an order of priority for transmission of information among the plurality of control units, and changes the order of priority in dependence upon the travelling state of the vehicle.

In a preferred embodiment, the transmission control means changes over transmission of information among the plurality of control units from periodic transmission to transmission in accordance with occurrence of an event, or from transmission in accordance with occurrence of an event to periodic transmission, in dependence upon the travelling state of the vehicle.

In a preferred embodiment, the transmission control means performs transmission of information with respect to a specific control unit periodically, renders transmission of information with respect to another control unit transmission that is in accordance with occurrence of an event, and changes the specific control unit in dependence upon the traveling state of the vehicle.

In another aspect of the present invention, the foregoing objects are attained by providing a multiplex transmission system in which a plurality of control units connected in decentralized fashion to a common transmission line transmit and receive information to and from one another, comprising means for specifying a communicating-party control unit with which the plurality of control units perform transmission and reception of information, and transmission control means for performing transmission of information with respect to the specified communicating-party control unit periodically, and changing the period of this transmission in dependence upon the specified communicating-party control unit.

According to a preferred embodiment, the transmission control means includes means for sensing a travelling state of a vehicle, wherein the transmission period is changed in dependence upon the communicating-party control unit and the travelling state of the vehicle.

In another aspect of the present invention, the foregoing objects are attained by providing a multiplex transmission system in which a plurality of control units connected in decentralized fashion to a common transmission line transmit and receive information to and from one another, comprising first control means for performing control in such a manner that information necessary for controlling one of the plurality of control units is transmitted from another control unit, discriminating means for determining whether operation of each control unit is in a stable state or unstable state; and second control means for changing the method of transmission control, which is performed by the first control means, between one method when a control unit is in the stable state and another method when the control unit is in the unstable state, based upon results of determination made by the discriminating means.

In a preferred embodiment, the second control means is so adapted that when the discriminating means has determined that one of the control units has performed a system reset and is in the unstable state, the second control means changes the method of transmission control, which is performed by the first control means, for a predetermined time following the system reset in such a manner that another control unit which transmits information necessary for control of the one control unit performs transmission of information at a period shorter than that which prevails when the one control unit is in the stable state.

In a preferred embodiment, the second control means is so adapted that when the discriminating means has determined that a certain control unit is in the stable state, the second control means changes the method of transmission control, which is performed by the first control means, in such a manner that another control unit which transmits information necessary for control of the certain control unit performs transmission of information in accordance with occurrence of an event, and when the discriminating means has determined that the certain control unit is in the unstable state, the second control means changes the method of transmission control, which is performed by the first control means, in such a manner that the other control unit performs transmission of information periodically.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a timing chart illustrating data transmission and reception among control units in a second embodiment;

FIG. 8A is a diagram showing a map of data transmission/reception periods in a multiplex transmission system according to a fourth embodiment;

FIG. 11A is a timing chart illustrating control corresponding to resetting of a communication system during vehicle travel in the fifth embodiment; and FIG. 11B is a timing chart illustrating a modification of control corresponding to resetting of a communication system during vehicle travel in the fifth embodiment.

DESCRIPTION OF THE PREFERRED EMBODIMENTS

Preferred embodiments of the present invention will now be described in detail with reference to the accompanying drawings.

First Embodiment

A first embodiment of the present invention will now be described.

Figure 1:
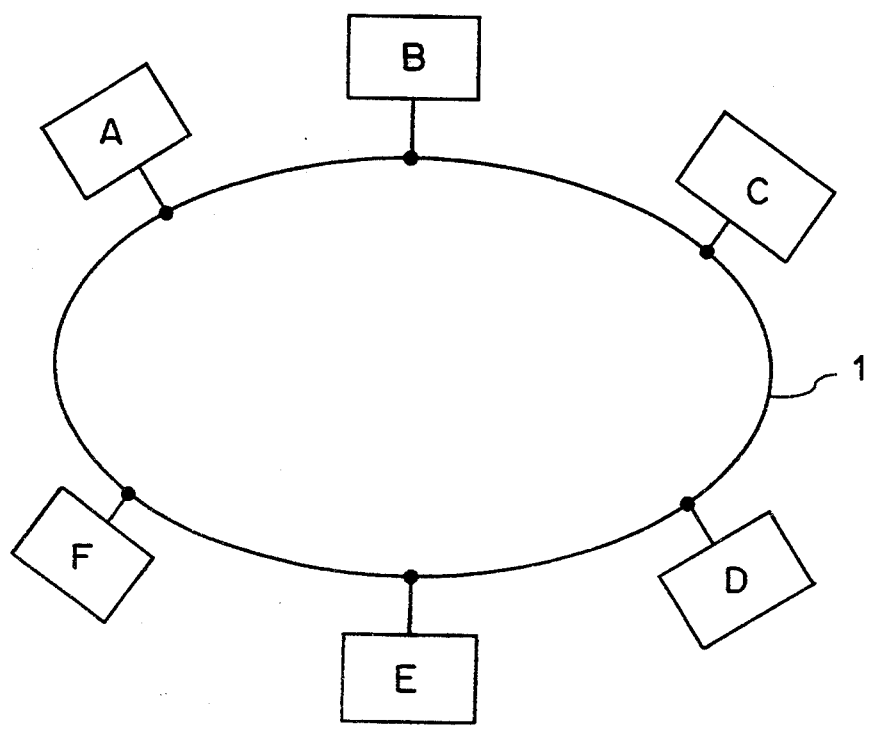
FIG. 1 is a diagram showing the construction of a multiplex transmission system according to an embodiment of the present invention.

FIG. 1 illustrates a multiplex transmission system according to a first embodiment of the invention. As shown, six control units A through F are connected to a pair of multiplex transmission lines 1. The control units transmit and receive data to and from one another by CSMA/CD via the multiplex transmission lines 1.

Figure 2:
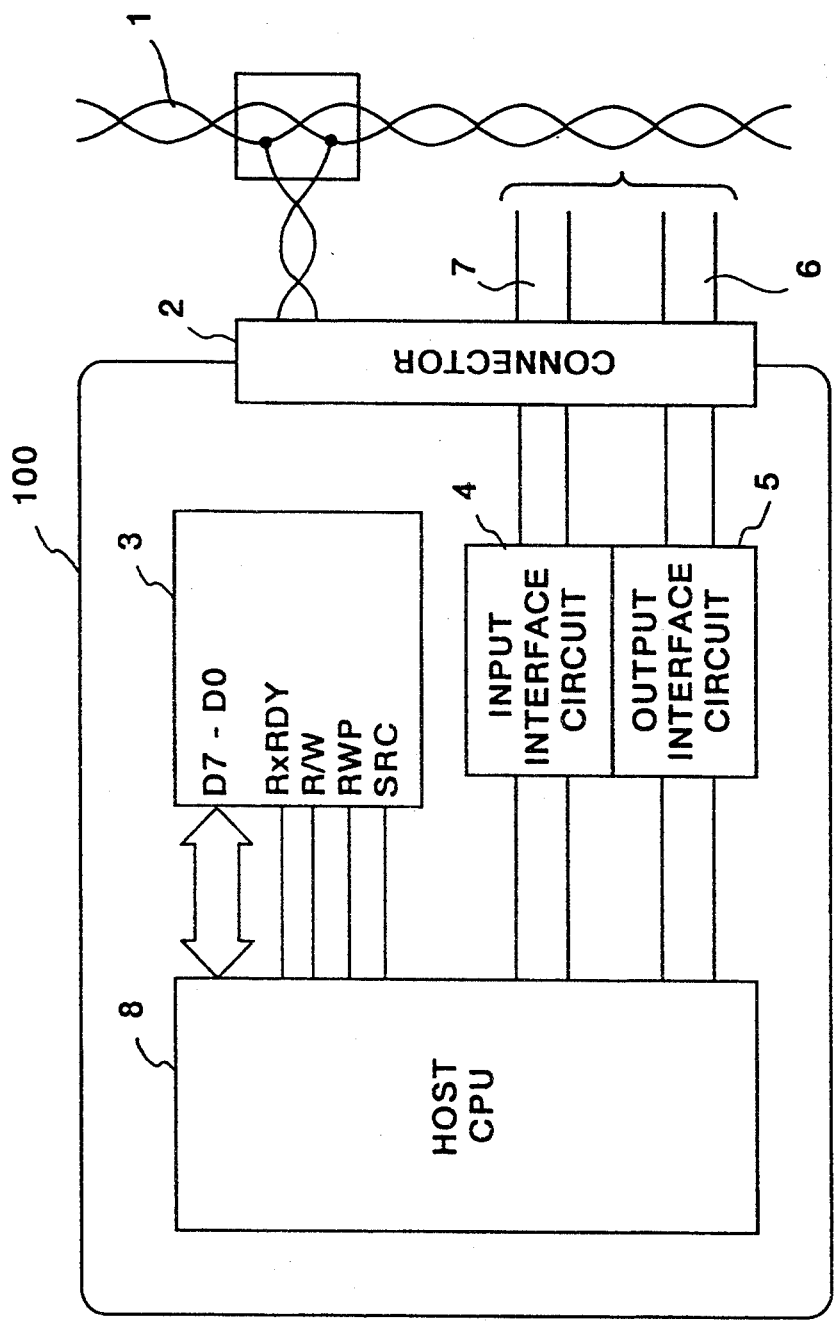
FIG. 2 is a block diagram illustrating the construction of a control unit.

FIG. 2 is a block diagram illustrating the construction of a control unit. As shown in FIG. 2, the control unit, indicated by numeral 100, is connected to the multiplex transmission lines 1 via wires 6, 7 and a connector 2, described later. A multiplex interface module 3 performs carrier detection and collision detection on the multiplex transmission lines 1 via the connector 2, reads serial data from the multiplex transmission lines 1, converts the serial data into parallel data ($D_7$-$D_0$) and sends the parallel data to a host CPU 8. In addition, the multiplex interface module 3 converts parallel data from the host CPU 8 into serial data, performs a vertical parity check and computes an error detection code. In other words, the multiplex interface module 3 administers control of the physical layer level in the network.

The host CPU 8 and the actual load (not shown) are connected via the wires 6, 7, an input interface circuit 4 and an output interface circuit 5. A signal from the load is analyzed by the host CPU 8, where the signal is converted into a predetermined data format. The converted data is sent to the multiplex transmission lines 1 via the multiplex interface module 3.

Figure 3:
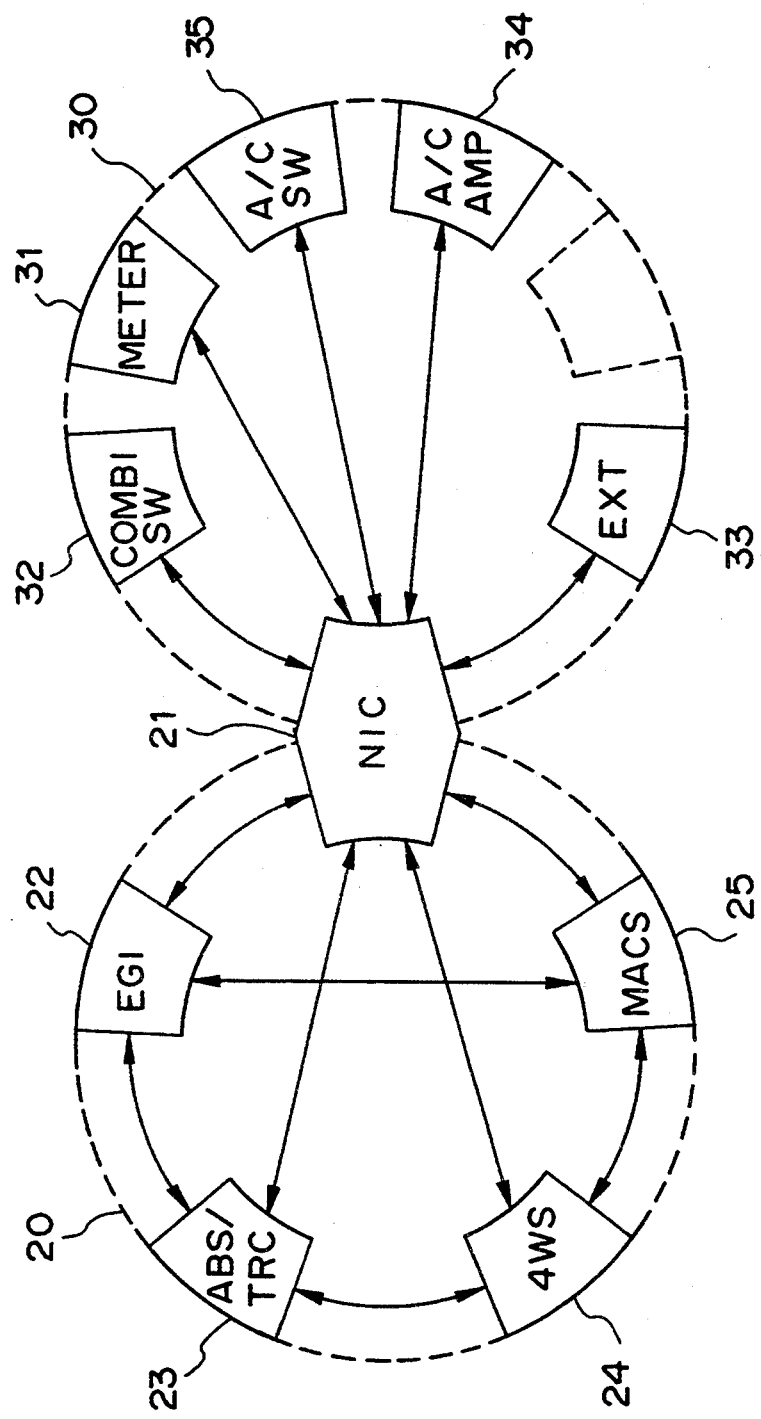
FIG. 3 is a diagram illustrating a multiplex communication map according to the embodiment.

FIG. 3 diagrammatically represents a multiplex communication map in the multiplex transmission system of the embodiment.

The control system (a cooperative control multiplex system) of the multiplex transmission system shown in FIG. 3 is composed of a cooperative-control system multiplex network 20 and a body-system multiplex network 30. These two networks 20, 30 transmit and receive signals via an NIC (network integration controller) 21 operating as a relay unit.

The transmission/reception of signals among cooperative control units EGI 22, ABS/TRC 23, 4WS 24 and MACS 25, which constitute the cooperative- control system multiplex network 20, and between each of these control units and the NIC 21, is performed in the directions indicated by the arrows. Signals which the cooperative control units transmit to and receive from one another are referred to as "cooperative signals", and signals which the NIC 21 and cooperative control units transmit to and receive from each other are referred to as "body signals".

The principal functions of the cooperative control units will now be described in brief.

The EGI 22 is a control unit which administers control of the engine, such as control of fuel injection. In response to reception of a torque-down request from the ABS/TRC 23, which is related to control of anti-skid braking, the EGI 22 sends back a torque-down execution signal and transmits a gear-position signal, etc. These control operations contribute to smooth starting and acceleration of the vehicle.

In order to improve the stability of the vehicle, the ABS/TRC 23 transmits a signal indicative of poor road conditions, a signal indicative of road surface μ, etc., to the 4WS 24, and performs rear-wheel steering control suited to the travelling conditions. In addition, for the purpose of improving stability, the ABS/TRC 23 performs an exchange of a system-down signal and a transmission-failure signal among the cooperative control units and carries out mutual monitoring of the systems. The MACS 25 is a control unit for an active suspension.

Control units METER 31, A/CSW 35, A/CAMP 34, etc., which constitute the body-system multiplex network 30, transmit signals to and receive signals from solely the NIC 21 independently of the other control units. EXT 33 is a control unit which participates in fault diagnosis and inspection, the latter of which is performed on the manufacturing line.

Data transmission control in the cooperative-control multiplex system of this embodiment will be described next.

Figure 4A:
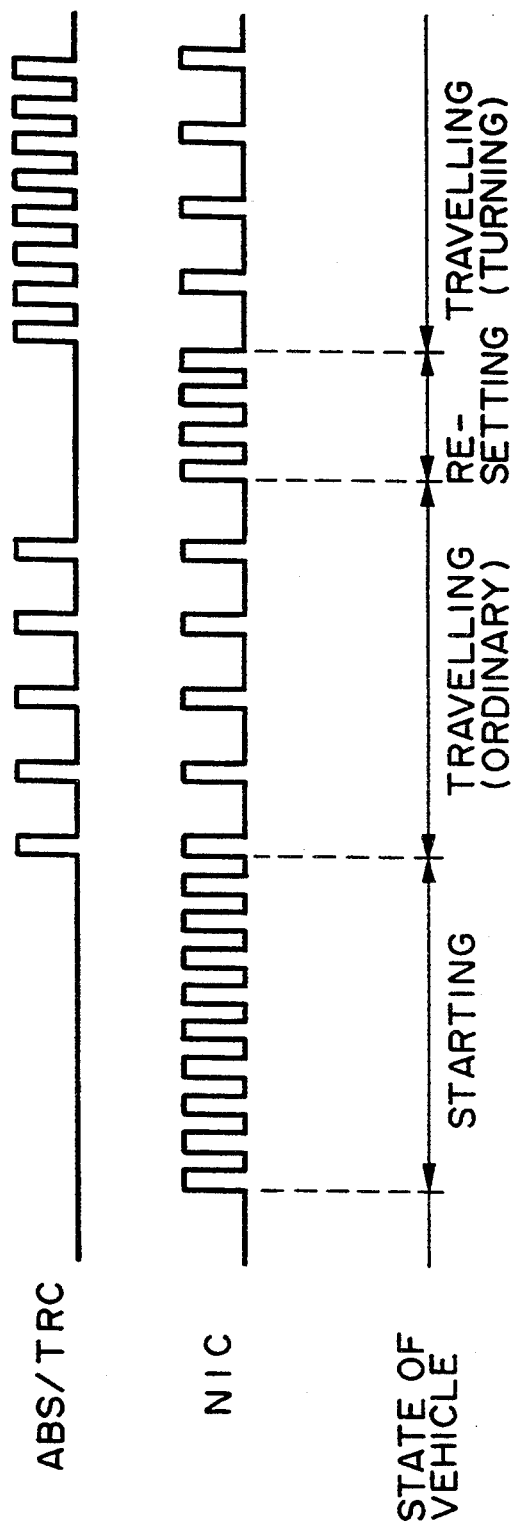
FIG. 4A is a timing chart illustrating the relationship between the state of a vehicle and data transmitted from control units in a multiplex transmission system according to a first embodiment.

FIG. 4A is a timing chart illustrating the relationship between the state of a vehicle and data transmitted from the control units NIC 21 and ABS/TRC 23. When the state of the vehicle is such that the engine is being started or the EGI 22 is being reset, as shown in FIG. 4A, the NIC 21 transmits data at a shorter period in comparison with that which prevails when the vehicle is travelling. When the ABS/TRC 23 has detected that the vehicle is turning, the signal transmission interval is shortened in comparison with the interval which prevails during ordinary vehicle travel. Examples of signals from the ABS/TRC 23 when the vehicle is turning are road-condition signals relating to a road having a low μ, a road in a bad condition, etc. These signals are sent to the 4WS 24.

Figure 4B:
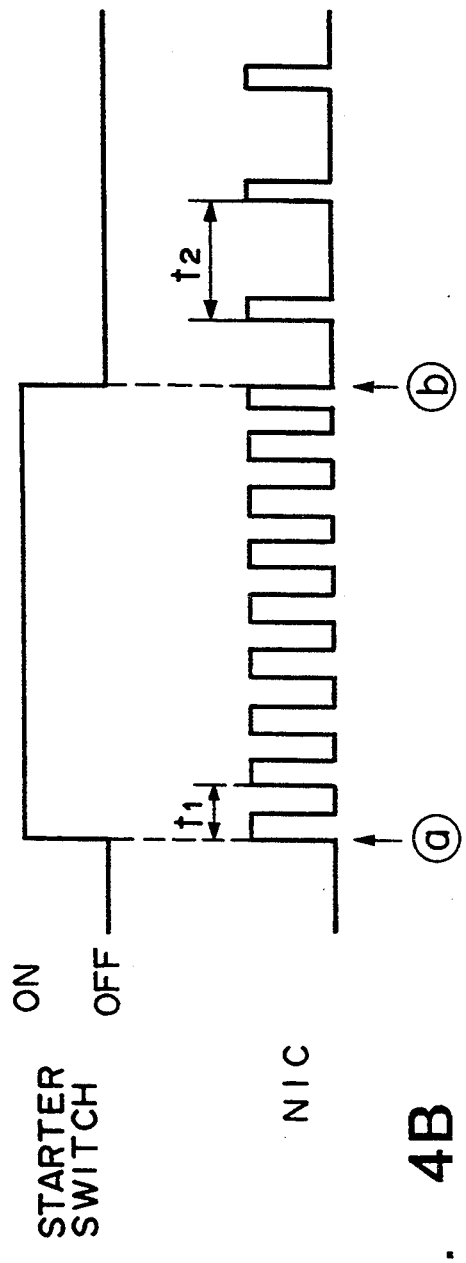
FIG. 4B is a timing chart illustrating communication control at starting of an engine in the multiplex transmission system according to the first embodiment.
Figure 4C:
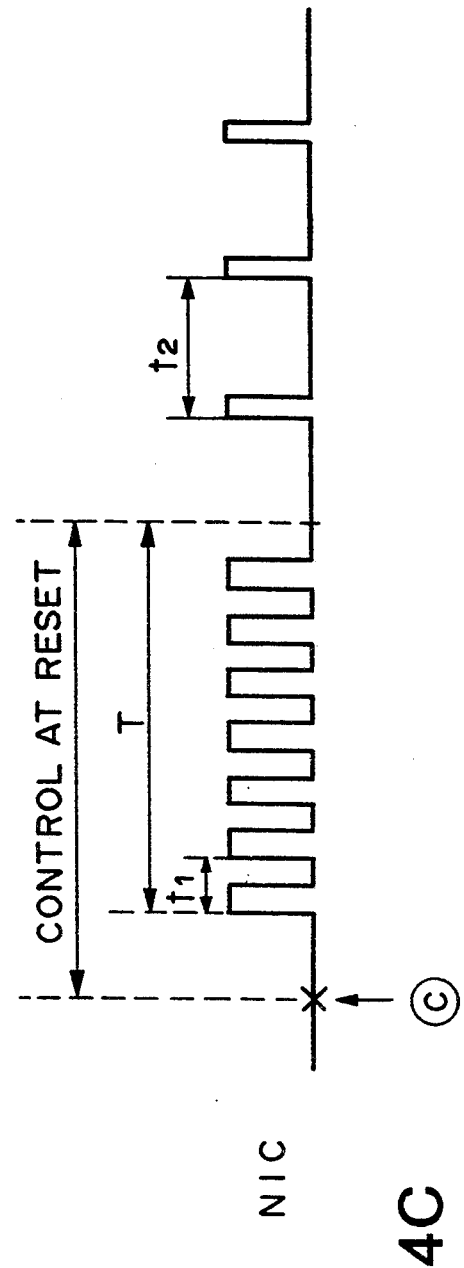
FIG. 4C is a timing chart illustrating control at resetting of a control unit in a multiplex transmission system according to the first embodiment.

FIGS. 4B and 4C illustrate the details of the data transmission performed by the NIC 21 at starting of the engine and at resetting of the EGI 22, mentioned above.

When a starter switch (not shown) is turned from OFF to ON in FIG. 4B (point (a)), starting of the engine begins and the NIC 21 begins to transmit a control signal to, say, the EGI 22, via the multiplex transmission lines 1. The period of time from point (a) to a point (b) at which the starter switch is turned from ON to OFF is adopted as a starting-time control period. During this period, the EGI 22 is in an unstable state in which the engine is difficult to control. In particular, the conditions are such that control of engine torque is difficult. Consequently, the NIC 21 performs the transmission of data with regard to the EGI 22 in a period $t_1$. Then, upon elapse of the starting-time control period, the NIC 21 performs a transmission of data in a period $t_2$ as control for when the vehicle is travelling in an ordinary manner. It goes without saying that the periods $t_1$ and $t_2$ are related as follows: $t_1 < t_2$.

FIG. 4C is a timing chart illustrating data transmission control of the NIC 21 from resetting of the control unit EGI 22 until this control unit is restored to the normal state.

In a case where EGI 22 is reset at point (c) in FIG. 4C, the NIC 21 starts a timer (not shown) and begins transmission of data at period $t_1$. The data transmission continues at the period $t_1$ for a fixed time T up to the moment timekeeping by the timer ends following the starting of the timer. Then, at elapse of the time T, the data transmission is performed at period $t_2$ as control for when the vehicle is travelling in an ordinary manner. Here also the relation between the periods $t_1$ and $t_2$ is $t_1 < t_2$.

Thus, by changing the period of data transmission from a specific control unit in dependence upon the state of the vehicle, control stability at starting and resetting is assured. In addition, when the vehicle is in a state other than that which prevails at the time of starting or resetting, the other control units are capable of gaining the right to access the multiplex transmission lines.

Further, when the vehicle is turning, the transmission period of the signals representing the road conditions can be shortened, thereby making it possible to improve the reliability of data transmission when the vehicle is in a state in which it is sensitive to the road surface.

Second Embodiment

A second embodiment of the present invention will now be described. The construction of the multiplex transmission system according to the following embodiment is the same as that of the multiplex transmission system in the first embodiment. In addition, the construction of the control units and the multiplex communication map in the multiplex transmission system are the same as those in the first embodiment. Accordingly, these need not be described again.

FIG. 5 is a timing chart illustrating data transmission and reception among the control units EGI 22, NIC 21, ABS/TRC 23 and 4WS 24 connected to the multiplex transmission lines 1 in this embodiment. As shown in FIG. 5, the EGI 22 and NIC 21 perform data transmission periodically. These control units are set to have the highest orders of priority for data transmission/reception in the multiplex transmission lines 1.

In ordinary data transmission/reception, the ABS/TRC 23 and 4WS 24 have a lower order of priority than the EGI 22 and NIC 21. However, when the vehicle is turning and travelling on a road having a low $\mu$ in interval T, the order of priority for data transmission/reception of the control units in the multiplex transmission lines 1 is rewritten so that the transmission/reception of data between the ABS/TRC 23 and 4WS 24 assumes the highest priority. Then, in interval T, both of these control units periodically perform transmission/reception of data related to control of 4WS, etc.

After the transmission/reception of data between the ABS/TRC 23 and 4WS 24 in interval T, the transmission/reception of data between the EGI 22 and NIC 21 again assumes the highest priority in the multiplex transmission lines 1.

Thus, when a control unit having a high order of priority on the transmission lines is performing a transmission/reception of data and, at such time, there is an increase in the frequency of a data transmission of a control unit important in terms of traveling safety of the vehicle even though this control unit has a lower order of priority, the order of priority of this control unit is raised temporarily, thereby making it possible to improve vehicle safety.

In this embodiment, the data transmission/reception of the ABS/TRC and 4WS is given the highest order of priority in the interval T. However, it may be so arranged that the data transmission from the NIC is given the highest priority only when the engine is started or when system resetting is performed.

Figure 6:
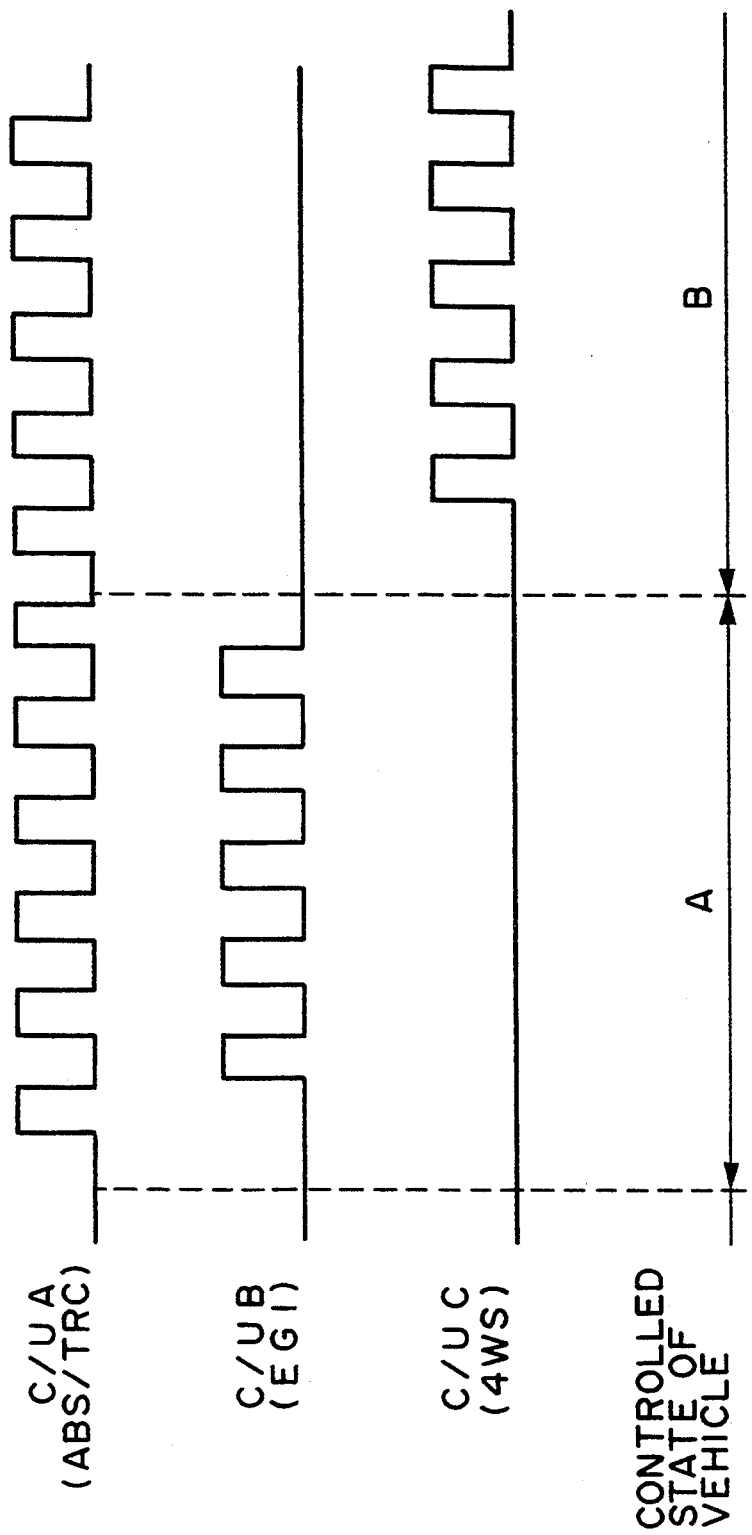
FIG. 6 is a timing chart illustrating a modification of the control state of a vehicle and transmission of data among control units.

The present invention is not limited to the foregoing embodiments. For example, as shown in FIG. 6, an arrangement may be adopted in which a party to a periodic transmission of data between two control units is changed over depending upon the controlled state of the vehicle. More specifically, the ABS/TRC changes over the party to a periodic data transmission from EGI to 4WS when, with ABS/TRC adopting EGI as a specific control unit, data transmission/reception is being performed between the two control units (interval A in FIG. 6) and when there is an increase in the amount of communication with 4WS, which is a party that performs cooperative control having the highest order of priority as far as ABS/TRC is concerned (interval B in FIG. 6).

By adopting this expedient, a data transmission between ABS/TRC and the control unit that performs cooperative control having the highest order of priority can be executed without interfering with a data transmission with regard to other control units.

Third Embodiment

Control of data transmission in a cooperative control multiplex system according to a third embodiment will now be described.

Figure 7:
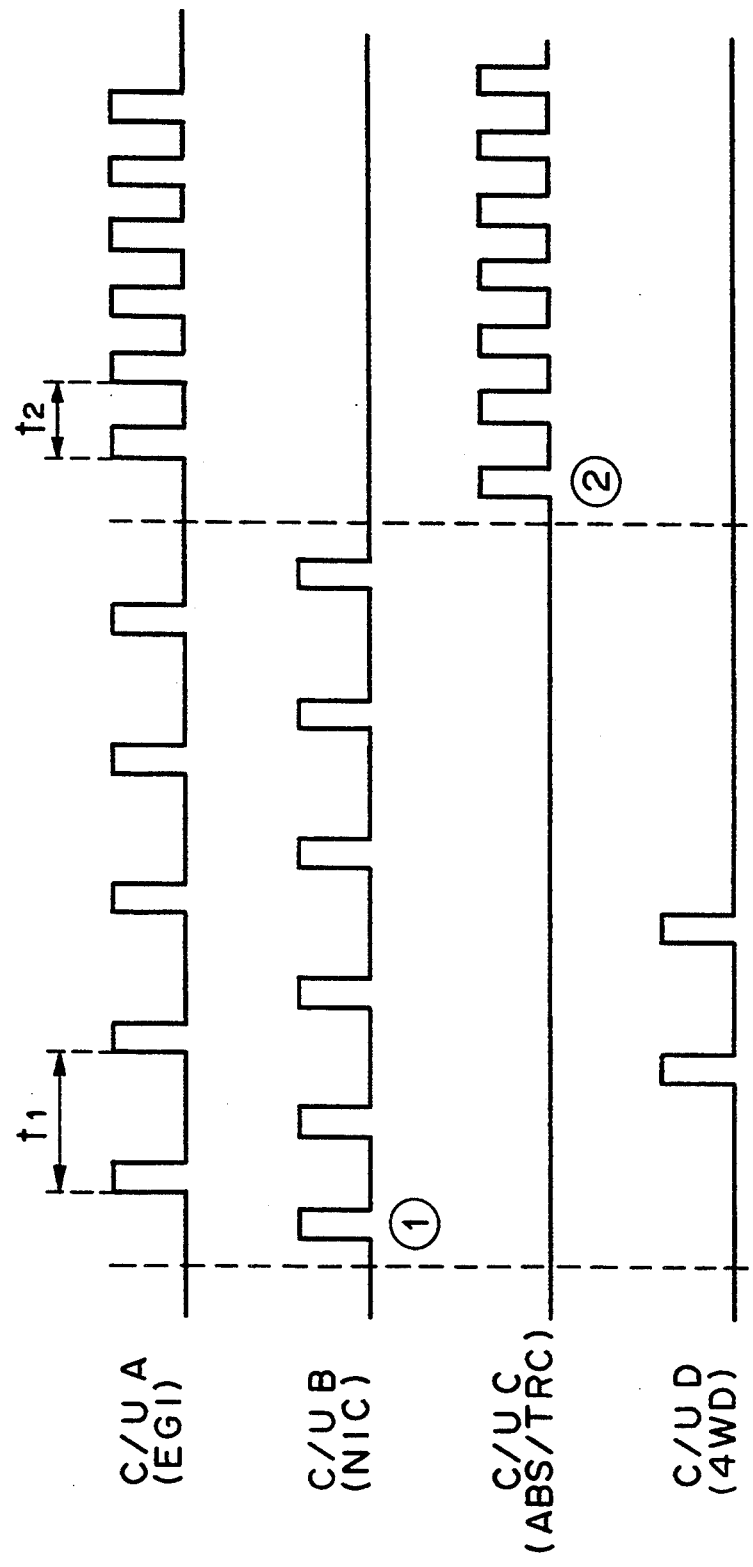
FIG. 7 is a timing chart illustrating the relationship among data transmission timings of control units in a multiplex transmission system according to a third embodiment.

FIG. 7 is a timing chart illustrating the relationship among data transmission timings of control units. As shown in FIG. 7, when a control unit C/UA (EGI 22) receives an initial transmission of data (data ① in FIG. 7) from a control unit C/UB (NIC 21), it becomes aware of the fact that the party to control is the NIC 21. From reception of data ① onward, both control units transmit and receive data at a period $t_1$ ($t_1$ = 100 ms).

On the other hand, when the EGI 22 receives a transmission of data (data ② in FIG. 7) from a control unit C/UC (ABS/TRC 23) after transmission/reception of data with respect to the NIC 21, it recognizes the fact that the other party is the ABS/TRC 23, just as in the case of the NIC 21. From reception of data ② onward, the EGI 22 and ABS/TRC 23 transmit and receive data at a period $t_2$ ($t_2$ = 12 ms). That is, the EGI 22 makes the period $t_2$ of the data transmission/reception with the ABS/TRC 23, which takes part in transmission/reception of control information having a high degree of importance in terms of vehicle safety, shorter than the period $t_1$ of the data transmission/reception with the NIC 21 whose degree of importance for control is not so high by comparison. In other words, the EGI 22 changes the degree of cooperative control depending upon the control unit which is the other party in the communication.

Another reason for making the period of data transmission/reception between the EGI 22 and the ABS/TRC 23 shorter than that between the EGI 22 and the NIC 21 is to lower the data transmission density on the data transmission lines between the EGI 22 and NIC 21. Consequently, while the EGI 22 and NIC 21 are performing a data transmission/reception at a fixed period, a control unit C/UD (4WS 24) is capable of transmitting desired data by occupying the transmission lines upon taking into account the timing of the aforesaid data transmission/reception.

Thus, the data transmission period which prevails when a data transmission/reception is performed periodically is changed over depending upon the control unit which is the other party, and the period of the data transmission/reception between control units taking part in important control is made shorter than the period of the data transmission/reception having a low degree of importance. As a result, it is possible to eliminate delays in terms of control, such as a delay in the idling raising operation of the EGI and a delay in the steering operation of the 4WS, which is caused by a delay in judging the road surface.

Further, by reducing the density of control data, which has a low degree of importance, on the transmission lines, it is possible to raise the data transmission probability of other control units.

Fourth Embodiment

A fourth embodiment according to the present invention will now be described.

The multiplex transmission system according to this embodiment is such that the control unit C/UA (EGI 22) possesses a map, which is illustrated in FIG. 8A, within a memory (not shown), with the period of data transmission/reception being changed based upon the relationship between the state of the vehicle and the control unit which is a party to communication. More specifically, based upon transmitted data from another control unit, the EGI 22 recognizes this control unit which is a party to the communication as well as the state of the vehicle and, based upon the results, decides the period of data transmission/reception from the map shown in FIG. 8A. The numerals in the map correspond to the period of the data transmission/reception.

In a case where the EGI 22 receives transmitted data from, say, the ABS/TRC 23 and recognizes from this data that the vehicle is in a state in which it is travelling on a road having a low μ, the EGI 22 selects "1" of vehicle state ③ from the map of FIG. 8(a), where "1" serves as the period of data transmission/reception with the ABS/TRC 23. As a result, the period of the data transmission/reception becomes 12 ms.

Figure 8B:
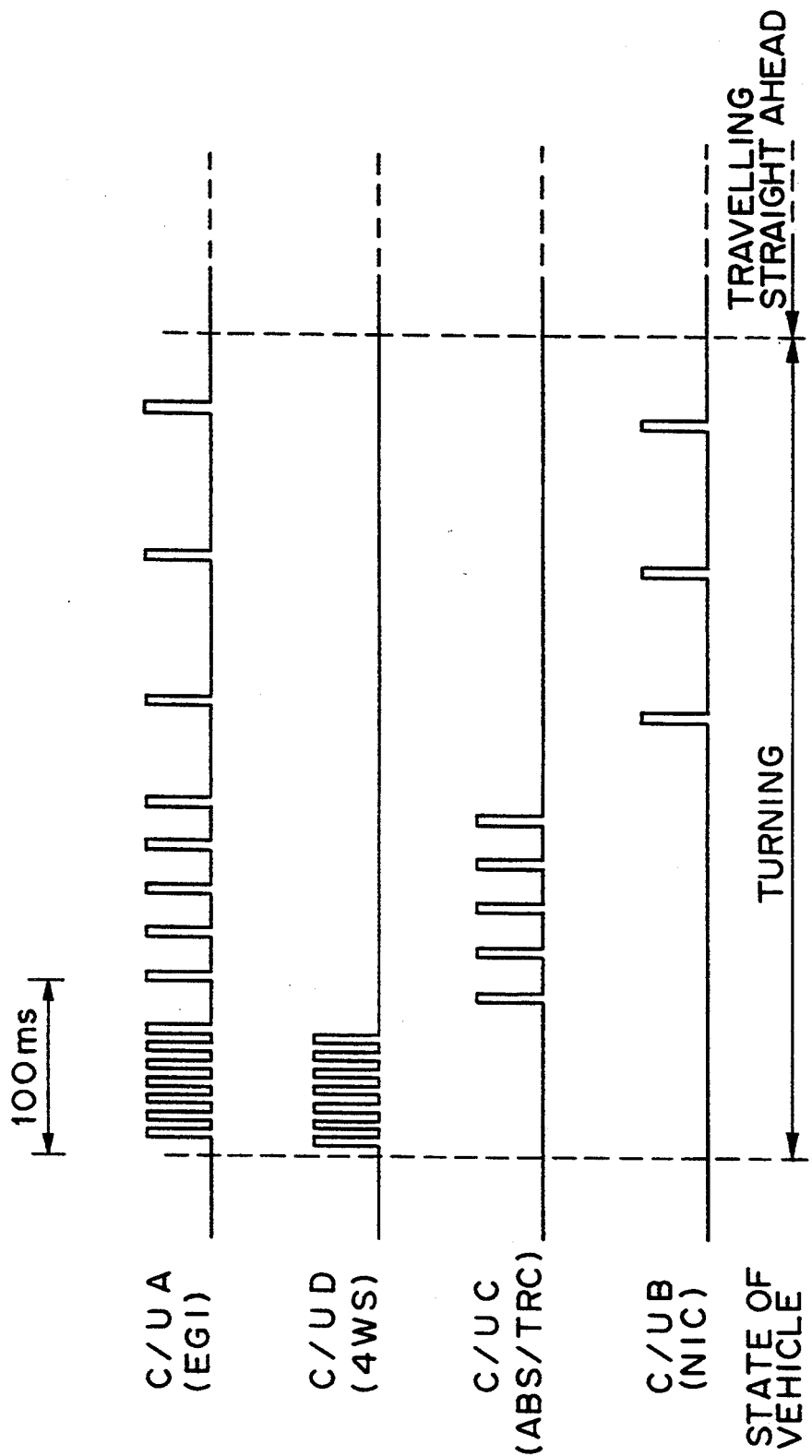
FIG. 8B is a timing chart illustrating the state of a vehicle and data transmission/reception among communicating-party control units.

FIG. 8B is a timing chart showing the relationship between the travelling state of a vehicle and a data transmission/reception among control units. In FIG. 8B, in a case where the EGI 22 receives data and recognizes that the control unit which is a party to the communication is the 4WS 24 and that the vehicle is turning, the EGI 22 selects "1", namely 12 ms, as the data transmission/reception period from vehicle state ② of the map shown in FIG. 8A. As a result, the EGI 22 performs a data transmission/reception with the 4WS at the period 12 ms. In a case where data is subsequently received from the ABS/TRC 23 and the vehicle is still in the process of turning, the EGI 22 selects "2", namely 24 ms, as the data transmission/reception period from vehicle state ② of the map shown in FIG. 8A. As a result, the EGI 22 performs a data transmission/reception at this period.

When the above-mentioned data transmission/reception is ended and the EGI 22 receives transmitted data from the NIC 21 while the vehicle is still turning (vehicle state ②), the EGI 22 selects "7" from the map of FIG. 8A and performs a data transmission/reception at a period of 70 ms. It should be noted that the period of data transmission/reception is decided by a similar method even after the vehicle starts travelling straight ahead upon completing the turn. However, the details are not described here.

Thus, by deciding beforehand the period of data transmission/reception between control units based upon the relationship between the travelling state of the vehicle and the control units which are the parties to communication, it is possible to transmit and receive, without delay, data which has a close relationship to vehicle travelling state, such as the turning state, and which takes part in rear-wheel steering and traction having a high degree of importance in terms of control.

Fifth Embodiment

A fifth embodiment of the present invention will now be described. It should be noted that the construction of the multiplex transmission system and multiplex communication map according to this embodiment are the same as those of the first embodiment and need not be described again.

Figure 9:
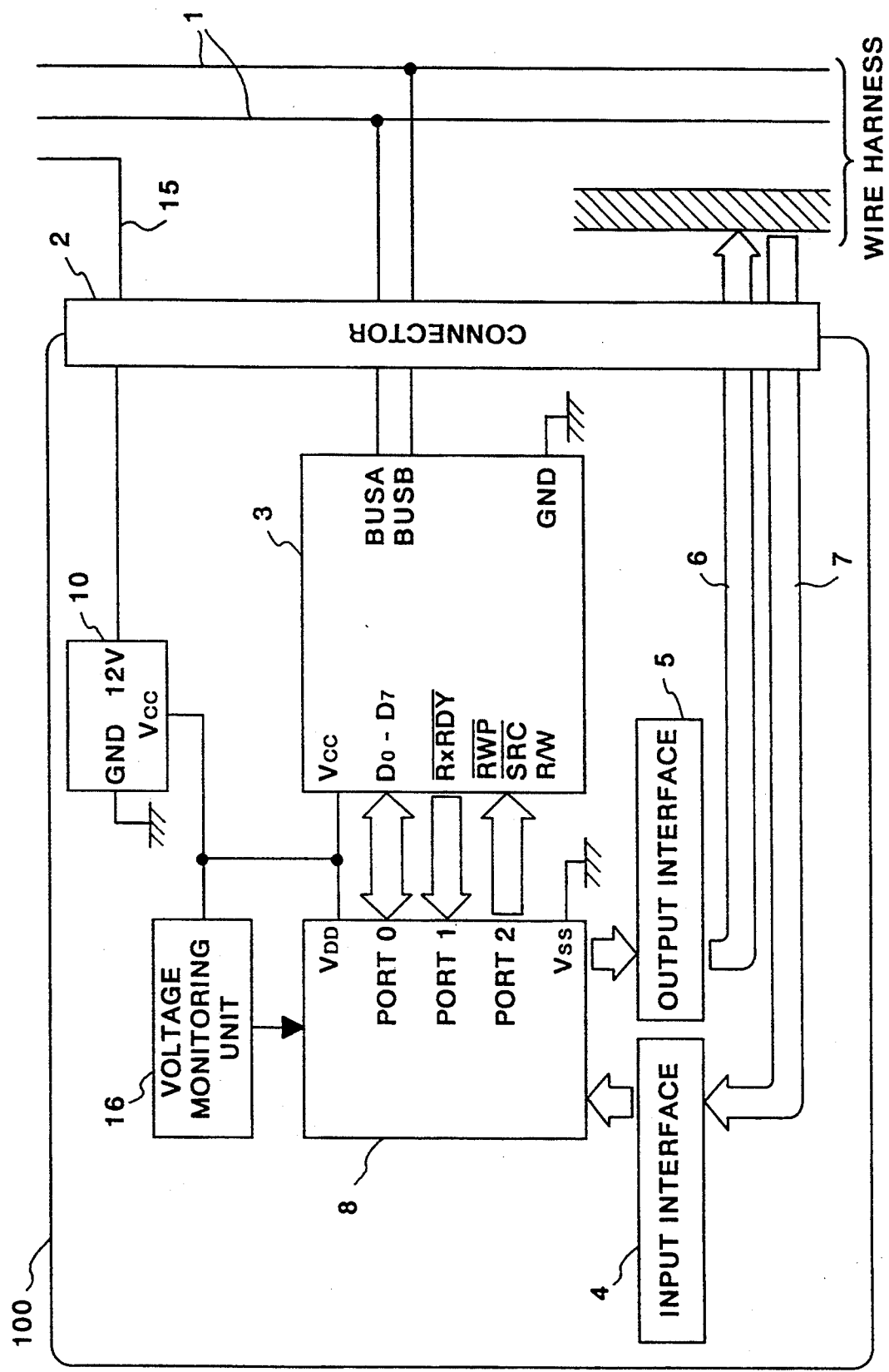
FIG. 9 is a block diagram illustrating the construction of a control unit in a multiplex transmission system according to a fifth embodiment.

FIG. 9 is a block diagram illustrating the construction of a control unit according to this embodiment. As shown in FIG. 9, the control unit, indicated by numeral 100, is connected to a wire harness, which includes the multiplex transmission lines 1, and a power-supply line 15 via the connector 2. The multiplex interface module 3 performs carrier detection and collision detection on the multiplex transmission lines 1 through BUSA, BUSB, reads serial data from the multiplex transmission lines 1, converts the serial data into parallel data ($D_7$-$D_0$) and sends the parallel data to the host CPU 8. In addition, the multiplex interface module 3 converts parallel data from the host CPU 8 into serial data, performs a vertical parity check and computes an error detection code. In other words, the multiplex interface module 3 administers control of the physical layer level in the network.

The host CPU 8 and the actual load (not shown) are connected via the wires 6, 7, an input interface circuit 4 and an output interface circuit 5. A signal from the load is analyzed by the host CPU 8, where the signal is converted into a predetermined data format. The converted data is sent to the multiplex transmission lines 1 via the multiplex interface module 3.

A battery (not shown) supplies a battery voltage of 12 V to a D/D converter 10, which converts this voltage into an operating voltage $V_{CC}$ of the multiplex interface module 3 and host CPU 8. The voltage $V_{CC}$ is monitored at all times by a voltage monitoring unit 16. When the voltage value does not satisfy a predetermined value, the monitoring unit 16 regards this as an operating voltage error and so informs the host CPU 8.

Control at Engine Start

Described next will be control at the time the engine is started in the cooperative-control multiplex system, especially control for assuring good startability of the EGI.

Figure 10A:
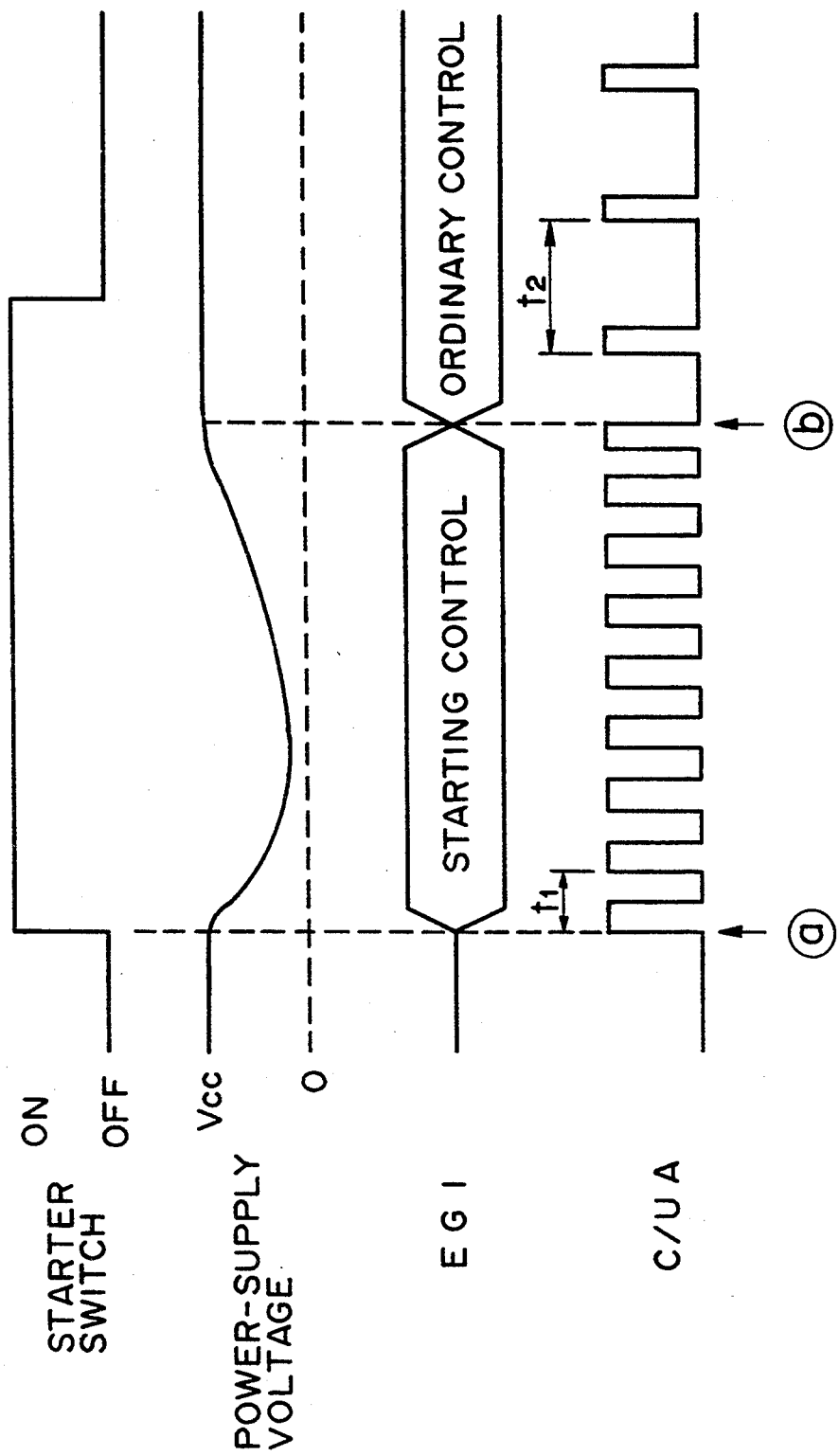
FIG. 10A is a timing chart illustrating communication control at starting of an engine according to a fifth embodiment.

FIG. 10A is a timing chart showing the relationship between a change in the output voltage (the operating power-supply voltage of the multiplex interface module 3 or host CPU 8) of the D/D converter 10 in control unit 100, which change accompanies operation of a starter switch (not shown), and the operation of the control unit. When the starter switch is turned from OFF to ON in FIG. 10B (point ⓐ), the output voltage (power-supply voltage $V_{CC}$) of the D/D converter 10 gradually declines owing to consumption of power due to starting of the engine. As mentioned above, the power-supply voltage of each control unit is monitored at all times by the voltage monitoring unit 16. The EGI 22 which contributes to engine control and the control unit (C/UA in this example) which transmits the data necessary for the EGI 22 receive signals from their internal voltage monitoring units 16 and thus learn of the fact that the voltage has dropped below the predetermined value.

At starting of the engine, the EGI 22 receives a signal necessary for this control from the C/UA, which is the other control unit. The period of time from point ⓐ to a point ⓑ at which the power-supply voltage of this control unit returns to the predetermined value is adopted as the starting-time control period of the EGI 22. During this period, the EGI 22 is in an unstable state in which the engine is difficult to control. In particular, the conditions are such that control of engine torque is difficult. Consequently, the C/UA periodically transmits data to the EGI 22 and makes this period ($t_1$) shorter than the ordinary period ($t_2$), described below.

When the power-supply voltage of the control unit C/UA returns to the predetermined value, data is transmitted from the C/UA to the EGI 22 only when there is a change in the ordinary communication mode, namely when an event occurs and there is a change in the status of the data transmitted from the C/UA. As a result, the EGI 22 begins performing ordinary control. Accordingly, here the period $t_2$ is not a fixed period.

Control during Travel

Described next will be control for dealing with resetting of the communication system, during travel, in the cooperative-control multiplex system.

FIG. 11A is a timing chart illustrating data transmission control from resetting of the control unit until this control unit is restored to the normal state.

As mentioned earlier, the NIC 21 is a control unit, which serves as a relay unit in the cooperative-control multiplex system, administers the transmission of signals that are important in terms of control. Accordingly, in a case where the NIC 21 undergoes system reset as caused by an abnormality in the power-supply system during vehicle travel, urgent restoration of control becomes necessary.

In a case where the NIC 21 undergoes system reset at point (d) in FIG. 11A, the NIC 21 starts a timer (not shown) and forcibly transmits data to the other control unit at the constant period t. The data transmission continues at the period t for a fixed time T up to the moment timekeeping by the timer ends following the starting of the timer. Then, at elapse of the time T, the ordinary communication mode is restored.

Thus, as described above, even when there is a drop in the power-supply voltage of a control unit at starting of the engine, the transmission of data to the control unit which administers engine control is performed faster than usual and periodically during this period. As a result, the communication operation is prevented from becoming unstable.

Further, even if a reset occurs in the control unit, which takes part in the communication system, during vehicle travel, after the reset the data is transmitted forcibly at a constant period to the other control unit which receives the data from the first-mentioned control unit. Accordingly, rapid restoration of the control unit is possible.

Figure 10B:
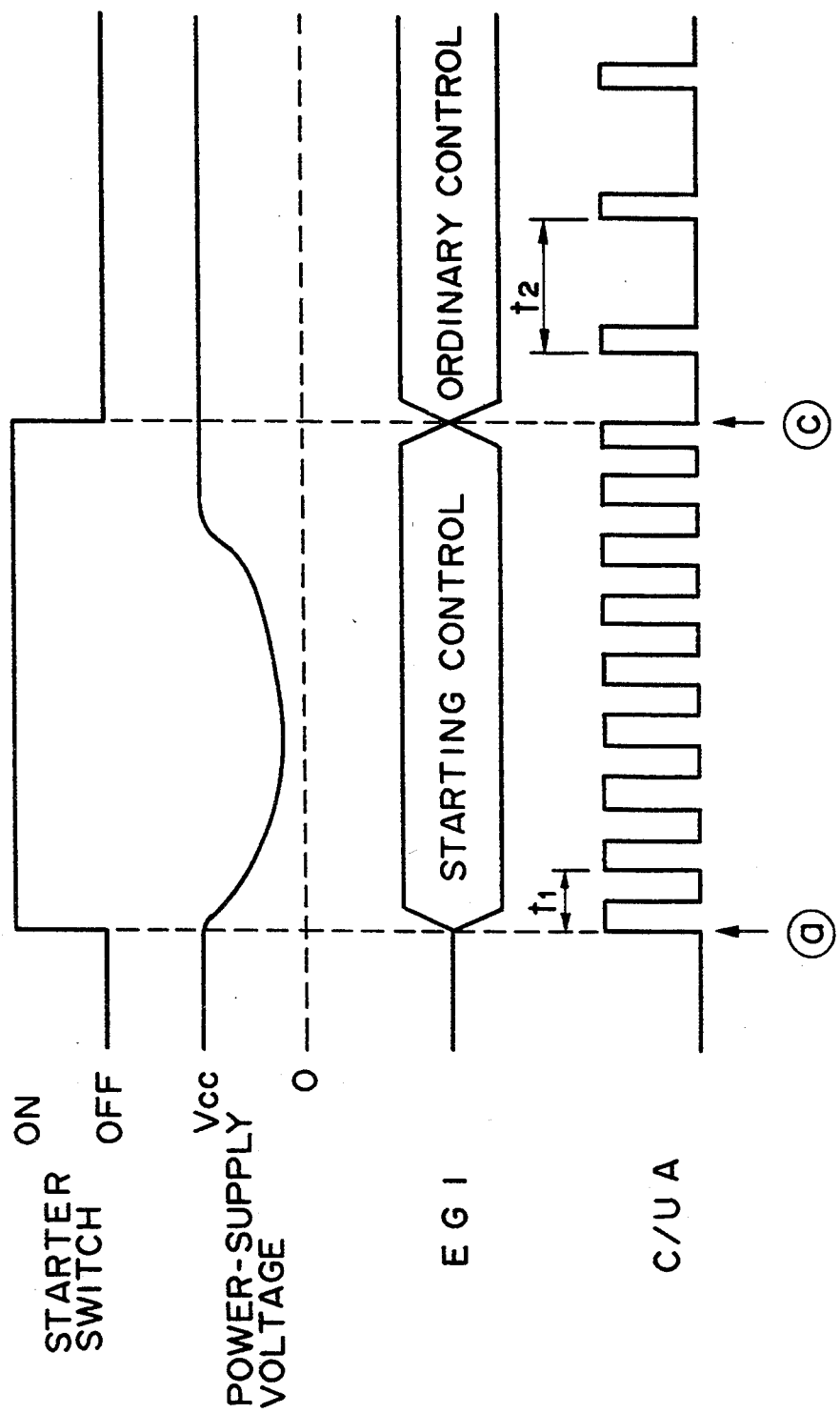
FIG. 10B is a timing chart illustrating a modification of communication control at starting of an engine according to the fifth embodiment.

In control at starting of the engine in the fifth embodiment described above, the data transmission from the control unit C/UA to the EGI 22 is returned from a periodic data transmission to ordinary communication when the power-supply voltage of the control unit C/UA returns to the predetermined value. However, as shown in FIG. 10B, an arrangement may be adopted in which the control unit C/UA recognizes, on its own or based upon information from the other control unit, that the starter switch has been turned from ON to OFF [point (c) in FIG. 10B], whereupon the ordinary communication mode is restored.

In a case where the NIC 21 undergoes system reset in control during vehicle travel, the timer is started, a data transmission is forcibly performed at a fixed period with respect to the other control unit, and the ordinary communication mode is restored at the end of the timekeeping operation performed by the timer. If, as shown in FIG. 11B, the NIC 21 performs data transmission at the fixed period after the occurrence of the system reset and a predetermined signal is received [at point (e) in FIG. 11B] from the other control unit (C/UB in this example), the ordinary communication mode may be restored- Here an engine-stability signal, which indicates that the rotational speed of the engine has attained a stipulated value, or a busy signal from the travel control system, is used as the predetermined signal.

As many apparently widely different embodiments of the present invention can be made without departing from the spirit and scope thereof, it is to be understood that the invention is not limited to the specific embodiments thereof except as defined in the appended claims.

What is claimed is:

1. A multiplex transmission system, for use in an automotive vehicle, in which a plurality of control units connected in decentralized fashion to a common transmission line transmit and receive information to and from one another at a prescribed period, comprising:
    informing means for informing each control unit of the travelling state of the vehicle by providing the each control unit with the information; and
    transmission control means for changing the period in which the information is transmitted among the plurality of control units, the change being made by referring to a map which contains both the travelling state of the vehicle and corresponding information transmission periods.

2. The system according to claim 1, wherein said transmission control means decides an order of priority for transmission of information among the plurality of control units, and changes said order of priority in dependence upon the travelling state of the vehicle.

3. The system according to claim 1, wherein said transmission control means performs transmission of information with respect to a specific control unit periodically, and changes said specific control unit in dependence upon the travelling state of the vehicle, and wherein said specific control unit is specified from among said plurality of control units so as to act as a main control unit for obtaining a stable engine control 4. The system according to claim 1, wherein said transmission control means includes means for determining whether operation of each control unit is in a stable state or unstable state and changes the period of transmission of information during a time set by a timer, between one method when a control unit is in the stable state and another method when the control unit is in the unstable state, based upon results of the determination.

5. A multiplex transmission system, for use in an automotive vehicle, in which a plurality of control units connected in decentralized fashion to a common transmission line transmit and receive information to and from one another at a prescribed period, comprising:
    informing means for informing each control unit of the travelling state of the vehicle by providing the each control unit with the information; and
    transmission control means for changing the period in which the information is transmitted among the plurality of control units, the change being made in dependence upon the travelling state of the vehicle, wherein said transmission control means is adapted to change the period of transmission at starting of an engine in such a manner that the information is transmitted at a period shorter than said prescribed period.

6. A multiplex transmission system, for use in an automotive vehicle, in which a plurality of control units connected in decentralized fashion to a common transmission line transmit and receive information to and from one another, comprising:
    means for specifying a communicating-party control unit from among the plurality of control units, with which the plurality of control units perform transmission and reception of information; and
    transmission control means for performing transmission of information with respect to said specified communicating-party control unit periodically, and changing a period of the periodical transmission of information by referring to a map which contains both said specified communicating-party control unit and corresponding information transmission periods.

7. The system according to claim 6, wherein said transmission control means includes means for sensing a travelling state of the vehicle, wherein the period of transmission of information is changed in independence upon the specified communicating-party control unit and the travelling state of the vehicle.

8. The system according to claim 7, wherein said transmission control means includes means for determining whether operation of each control unit is in a stable state or unstable state and changes the period of transmission of information during a time set by a timer, between one method when a control unit is in the stable state and another method when the control unit is in the unstable state, based upon results of the determination.

9. The system according to claim 6, wherein said transmission control means includes means for determining whether operation of each control unit is in a stable state or unstable state and changes over transmission of information from periodic transmission to transmission in accordance with occurrence of an event, or from transmission in accordance with occurrence of an event to periodic transmission, in dependence upon the specified communication-party control unit and the travelling state of the vehicle, during a time set by a timer, between one method when a control unit is in the stable state and another method when the control unit is in the unstable state, based upon results of the determination.

10. The system according to claim 6, wherein said transmission control means performs transmission of information with respect to a specific control unit periodically, renders transmission of information with respect to the rest of said control units that is in accordance with occurrence of an event, and changes said specific control unit in dependence upon the travelling state of the vehicle, and wherein said specific control unit is specified from among said plurality of control units so as to act as a main control unit for obtaining a stable engine control.

11. A multiplex transmission system, for use in an automotive vehicle, in which a plurality of control units connected in decentralized fashion to a common transmission line transmit and receive information to and from one another, comprising:
first control means for performing control in such a manner the information necessary for controlling one of the plurality of control units is transmitted from the rest of said control units;
discriminating means for determining whether operation of each control unit is in a stable state or unstable state; and
second control means for changing the method of transmission control during a time set by a timer, which is performed by the first control means, between one method when a control unit is in the stable state and another method when the control unit is in the unstable state, based upon results of determination made by said discriminating means.

12. A multiplex transmission system, for use in an automotive vehicle, in which a plurality of control units connected in decentralized fashion to a common transmission line transmit and receive information to and from one another, comprising:
first control means for performing control in such a manner the information necessary for controlling one of the plurality of control units is transmitted from the rest of said control units;
discriminating means for determining whether operation of each control unit is in a stable state or unstable state; and
second control means for changing the method of transmission control during a time set by a timer, which is performed by the first control means, between one method when a control unit is in the stable state and another method when the control unit is in the unstable state, based upon results of determination made by said discriminating means, wherein said second control means is so adapted that when said discriminating means has determined that one of the plurality of control units has performed a system reset and is in the unstable state, said second control means changes the method of transmission control, which is performed by said first control means, for a predetermined time following the system reset in such a manner that said rest of said control units which transmit the information necessary for controlling said one of the plurality of control units perform transmission of information at a period shorter than that which prevails when said one of the plurality of control units is in the stable state.

13. A multiplex transmission system, for use in an automotive vehicle, in which a plurality of control units connected in decentralized fashion to a common transmission line transmit and receive information to and from one another, comprising:
first control means for performing control in such a manner the information necessary for controlling one of the plurality of control units is transmitted from the rest of said control units;
discriminating means for determining whether operation of each control unit is in a stable state or unstable state; and
second control means for changing the method of transmission control during a time set by a timer, which is performed by the first control means, between one method when a control unit is in the stable state and another method when the control unit is in the unstable state, based upon results of determination made by said discriminating means, wherein said second control means is so adapted that when said discriminating means has determined that said control unit is in the stable state, said second control means changes the method of transmission control, which is performed by said first control means, in such a manner that said rest of said control units which transmit the information necessary for controlling said control unit perform transmission of information in accordance with occurrence of an event, and when said discriminating means has determined that said control unit is in the unstable state, said second control means changes the method of transmission control, which is performed by said first control means, in such a manner that said rest of said control units perform transmission of information periodically.

14. A multiplex transmission system, for use in an automotive vehicle, in which a plurality of control units connected in decentralized fashion to a common transmission line transmit and receive information to and from one another at a prescribed period, comprising:

informing means for informing each control unit of the travelling state of the vehicle by providing the each control unit with the information; and transmission control means for changing the period in which the information is transmitted among the plurality of control units, the change being made in dependence upon the travelling state of the vehicle, wherein said transmission control means is adapted to change the period of transmission at turning the vehicle in such a manner that the information is transmitted at a period shorter than said prescribed period.

15. A multiplex transmission system, for use in an automotive vehicle, in which a plurality of control units connected in decentralized fashion to a common transmission line transmit and receive information to and from one another at a prescribed period, comprising:

first control means for performing control in such a manner the information necessary for controlling one of the plurality of control units is transmitted from the rest of said control units;

discriminating means for determining whether operation of each control unit is in a stable state or unstable state; and second control means for changing the period of transmission control, which is performed by the first control means, between one period when a control unit is in the stable state and another period when the control unit is in the unstable state, based upon results of determination made by said discriminating means.

16. The system according to claim 15, wherein said second control means is adapted to change the period of transmission at performing a system reset in such a manner that the information is transmitted at a period shorter than said prescribed period.

17. A multiplex transmission system, for use in an automotive vehicle, in which a plurality of control units connected in decentralized fashion to a common transmission line transmit and receive information to and from one another in a prescribed method, comprising:

determining means for determining a specific control unit from among the plurality of control units which transmit information necessary for controlling one of the plurality of control units;

informing means for informing each control unit of the travelling state of the vehicle by providing the each control unit with the information; and transmission control means for changing the method of transmission of information, which is performed by the specific control unit, in dependence upon the travelling state of the vehicle, wherein the specific control unit relates to an engine control and said transmission control means is adapted to change the method of transmission at starting of the engine.

18. A multiplex transmission system, for use in an automotive vehicle, in which a plurality of control units connected in decentralized fashion to a common transmission line transmit and receive information to and from one another in a prescribed method, comprising:

determining means for determining a specific control unit from among the plurality of control units which transmit information necessary for controlling one of the plurality of control units;

informing means for informing each control unit of the travelling state of the vehicle by providing the each control unit with the information; and transmission control means for changing the method of transmission of information, which is performed by the specific control unit, in dependence upon the travelling state of the vehicle, wherein the specific control unit relates to a turning of the vehicle and said transmission control means is adapted to change the method of transmission at turning the vehicle.

* * * * *